(12) United States Patent
Uchman et al.

(10) Patent No.: US 6,971,958 B2
(45) Date of Patent: Dec. 6, 2005

(54) APPARATUS AND METHOD FOR ATTACHMENT AND TORQUE TRANSFER FOR A CONSTANT VELOCITY JOINT

(75) Inventors: Frederick J. Uchman, Clarkston, MI (US); Theodore H. Collins, Rochester Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 10 days.

(21) Appl. No.: 10/810,479

(22) Filed: Mar. 26, 2004

(65) Prior Publication Data

US 2005/0215332 A1    Sep. 29, 2005

(51) Int. Cl.[7] ............................................. F16D 3/224
(52) U.S. Cl. ...................................... 464/145; 464/146
(58) Field of Search ............................... 464/146, 145, 464/906, 182; 411/338, 339

(56) References Cited

U.S. PATENT DOCUMENTS 5,334,096 A  *  8/1994  Iwao ........................... 464/146

\* cited by examiner

*Primary Examiner*—Aaron Dunwoody
(74) *Attorney, Agent, or Firm*—Jennifer M. Brumbaugh; Mick A. Nylander

(57) ABSTRACT

A constant velocity joint for use in a prop shaft of an automotive vehicle includes an outer race. The constant velocity joint also includes an inner race arranged within the outer race and a rolling element arranged between the outer race and the inner race. A cage is arranged between the outer race and the inner race such that the cage positions the rolling element therebetween. The constant velocity joint also includes a flange contacting the outer race. A plurality of sleeves are arranged between the constant velocity joint outer race and the flange. A plurality of fasteners will secure the outer race to the flange.

20 Claims, 3 Drawing Sheets

APPARATUS AND METHOD FOR ATTACHMENT AND TORQUE TRANSFER FOR A CONSTANT VELOCITY JOINT

BACKGROUND OF THE INVENTION

1. Field of the Invention

The present invention generally relates to constant velocity joints and more particularly, relates to a method and apparatus of attachment and torque transfer for a constant velocity joint.

2. Description of the Related Art

Constant velocity joints (CV joints) are common components in automotive vehicles. Typically, constant velocity joints are used where a transmission of constant velocity rotating motion is required. The common types of constant velocity joints are plunging tripod, a fixed tripod, a plunging ball joint and a fixed ball joint. These types of joints currently are used in front-wheel drive vehicles, rear-wheel drive vehicles, and on propeller shafts found in rear-wheel drive, all-wheel drive and four-wheel drive vehicles. The constant velocity joints are generally greased lubricated for life and sealed by a sealing boot when used on drive shafts. Therefore, constant velocity joints are sealed in order to retain grease inside the joint and keep contaminates, such as dirt and water out of the joint. To achieve this protection the constant velocity joint is usually enclosed at the opened end of the outer race by a sealing boot made of a rubber, thermoplastic or silicone type material. The opposite end of the outer race generally is enclosed by a dome or cap, known as a grease cap in the case of a disk type joint. A monoblock or integral stem and race design style joint is sealed by the internal geometry of the outer race. This sealing and protection of the constant velocity joint is necessary because contamination of the inner chamber of the constant velocity joint generally will cause internal damage to the joint.

A constant velocity joint's main function is the transmission of rotational movement and torque. In the prior art constant velocity joint assemblies, a variety of bolted joint designs are used to assemble the joint to a prop shaft or half shaft within an automotive vehicle. These bolted assemblies axially fix the constant velocity joint within the driveline. The torque is then transferred through the constant velocity joint via the bolts to either a prop shaft, differential, a half shaft or a wheel depending on the location of the constant velocity joint in the vehicle drive line system. The torque transfer typically happens through a combination of friction between the back of the joint and the flange end or a flange face and sheer loading through the bolts. The use of a bolted constant velocity joint system requires precise installation to prevent bolt loosening from vibration. The bolt loosening problem of some prior art joints is especially problematic because torque is transmitted through the bolts. If such bolts are not tightened down correctly it may be possible for a bolt in the prior art systems to become loose and thus lead to the loosening of the constant velocity joint and flange interface, which may increase vibrations, that will cause a failure of the prop shaft.

Therefore, there is a need in the art for a constant velocity joint that is capable of separating torque transmission functions from the bolts to alternate components. There also is a need in the art for a constant velocity joint that will separate the torque transmitting function from the attachment function in a constant velocity joint companion flange interface. There also is the need in the art for a constant velocity joint companion flange interface that reduces the number of attaching bolts but still separately provides for components to transmit torque through the joint.

SUMMARY OF THE INVENTION

One object of the present invention is to provide an improved constant velocity joint.

Another object of the present invention is to provide a constant velocity joint that separates the functions of torque transmission and attachment.

Yet a further object of the present invention is to provide a method of attachment and torque transmission via a bolt and dowel system.

Still a further object of the present invention is to provide a constant velocity joint that reduces the number of attaching bolts or fasteners.

It is still a further object of the present invention to provide solid dowels to transmit torque in the constant velocity joint and flange interface.

To achieve the foregoing objects a constant velocity joint according to the present invention is disclosed. The constant velocity joint includes an outer race and an inner race arranged within the outer race. The constant velocity joint also includes a flange contacting the outer race. The constant velocity joint also includes a plurality of sleeves contacting the outer race and the flange at an interface thereof. The constant velocity joint also includes a plurality of fasteners securing the outer race to the flange. The constant velocity joint uses the sleeves to transmit torque and the fasteners to attach the outer race to the flange.

One advantage of the present invention is that it provides an improved constant velocity joint.

A further advantage of the present invention is that the constant velocity joint separates torque transmission through the joint from attachment of the joint to a flange.

Still another advantage of the present invention is that the constant velocity joint may be able to reduce the number of attaching bolts.

Yet a further advantage of the present invention is that the reduction in the number of bolts and associated machining of the joint will reduce costs and complexity of installation of the constant velocity joint within the drive train system.

Still a further advantage of the present invention is the ease of installation of the constant velocity joint within the drive train system.

Still a further advantage of the present invention is the removal of shear loading from the bolts within a constant velocity joint.

Still another advantage of the present invention is the reduction in vibration and thus loosening of bolts in the constant velocity joint.

Other objects, features and advantages of the present invention will become apparent from the subsequent description and appended claims, taken in conjunction with the accompanying drawings.

BRIEF DESCRPTION OF THE DRAWINGS

DESCRIPTION OF THE PREFERRED EMBODIMENT(S)

Figure 1:
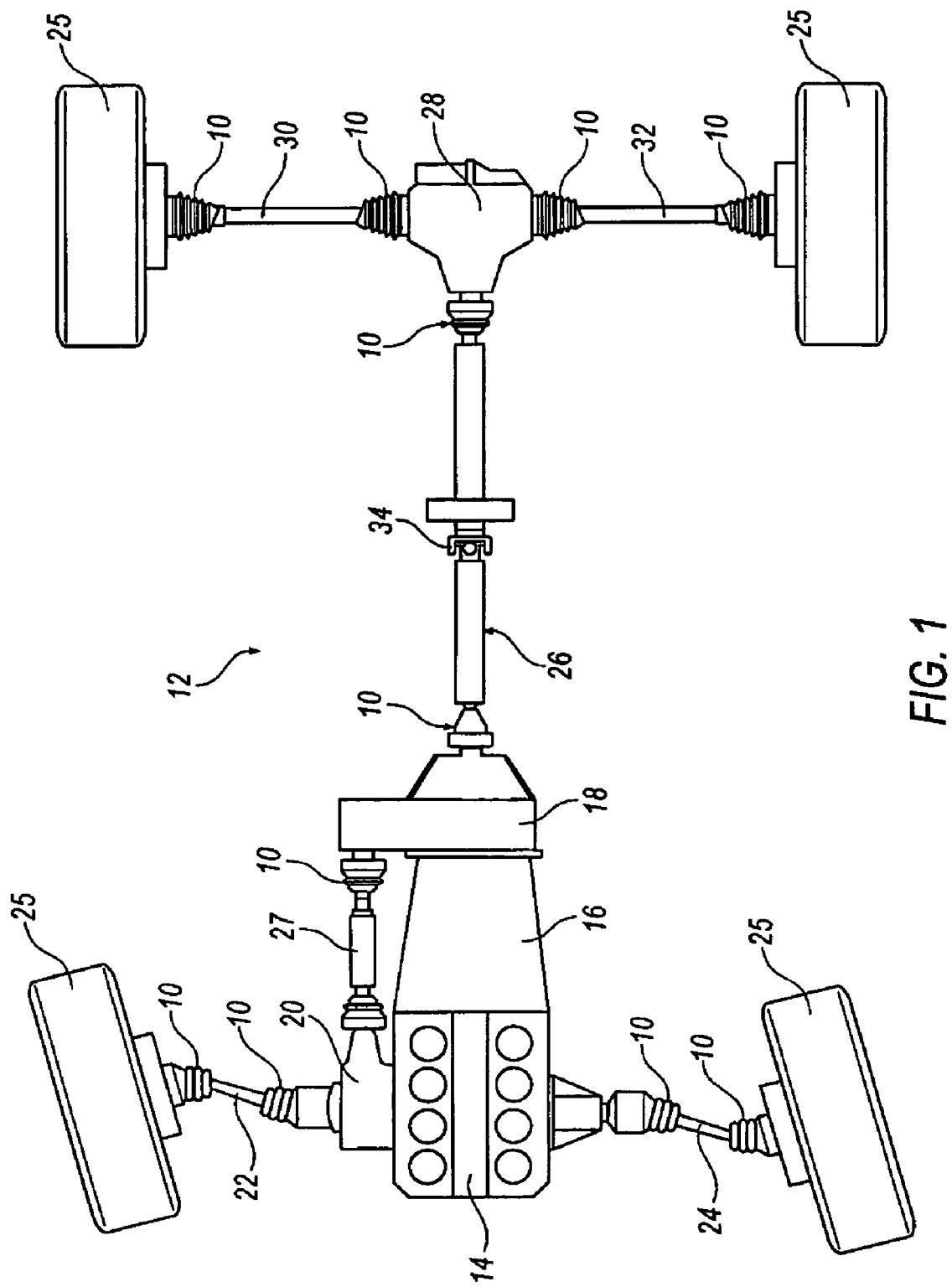
FIG. 1 shows a plan view of a vehicle drive line.

Referring to the drawings, a constant velocity joint 10 according to the present invention is shown. It should be noted that all types of CV joints, such as plunging tripods, a fixed tripod, a plunging ball joint, a fixed ball joint, etc., may be used with the present invention. However, the embodiment in FIG. 2 shows a plunging ball joint.

FIG. 1 shows a typical drive line 12 in an automotive vehicle. The drive line 12 of FIG. 1 represents a typical all-wheel drive vehicle, however it should be noted that the constant velocity joints 10 of the current invention can also be used in rear-wheel drive vehicles, front-wheel drive vehicles, all-wheel drive vehicles and four-wheel drive vehicles. The drive line 12 includes an engine 14 that is connected to a transmission 16 and a power take off unit 18. A front differential 20 has a right hand side half shaft 22 and a left hand side half shaft 24, each of which are connected to a wheel 25 and deliver power to those wheels. On both ends of the right hand front half shaft 22 and left hand front half shaft 24 are constant velocity joints 10. The propeller shaft 27 connects the front differential 20 to the power take off unit 18. The propeller shaft 26 connects the power take off unit 18 to the rear differential 28, wherein the rear differential 28 includes rear right hand side shaft 30 and a rear left hand side shaft 32, each of which ends with a wheel 25 on one end thereof. A constant velocity joint is located on both ends of the half shaft that connects the wheel 25 and the rear differential 28. The prop shaft 26, as shown in FIG. 1, is a two-piece propeller shaft that includes a carden joint 34 and two high speed constant velocity joints 10. The constant velocity joints 10 transmit power to the wheels 25 through the drive shaft 26 even if the wheels 25 or the shaft have changing angles due to steering, suspension, bounce, and rebound. The constant velocity joints 10 may be of any of the standard types known, such as plunging tripod, cross groove joint, fixed ball joint, fixed tripod joint, double offset joints, etc., all of which are commonly known terms in the art for different varieties of constant velocity joints. The constant velocity joints 10 allow for transmission of constant velocities at angles which are found in everyday driving of automotive vehicles and both the half shafts and prop shafts of these vehicles.

Figure 2:
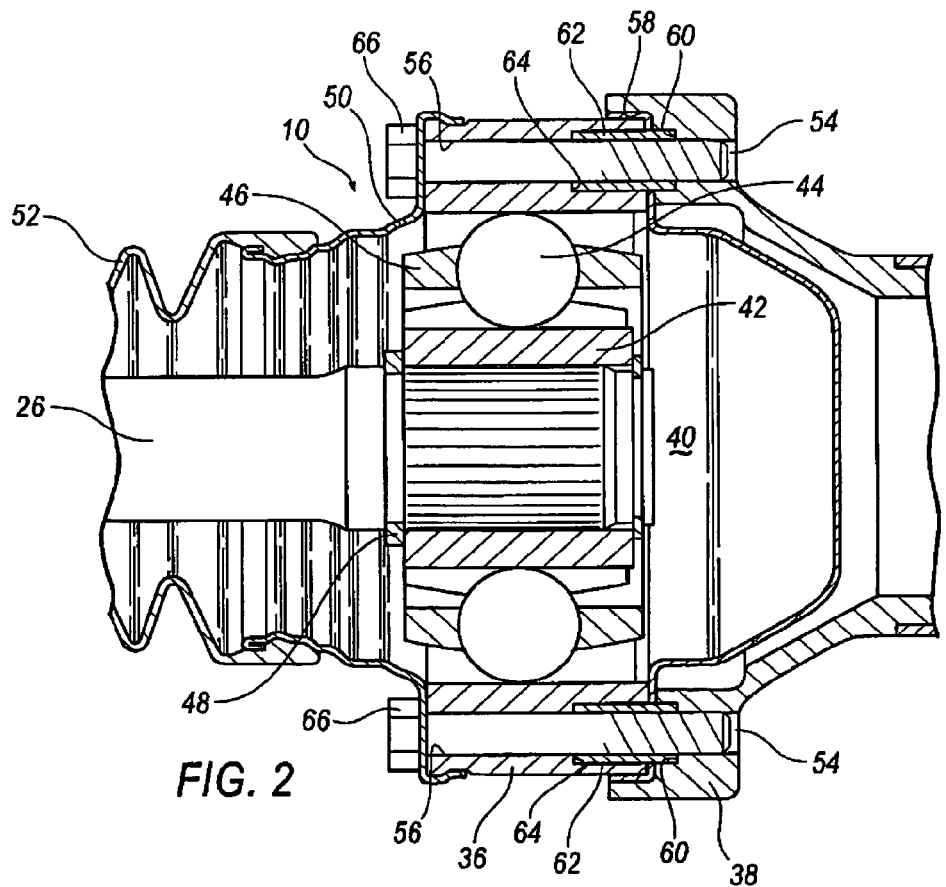
FIG. 2 shows a cross section of a constant velocity joint according to the present invention.

FIG. 2 shows an embodiment of the current invention. The constant velocity joint 10 is a plunging ball constant velocity joint which is generally used in a prop shaft or half shaft of an all-wheel drive vehicle. It should be noted that any other type of CV joint, such as but not limited to a fixed constant velocity joint, may also be used for the present invention. The constant velocity joint 10 includes an outer race 36 which has one end thereof proximate to a flange 38. An inner wall of the outer race generally defines a constant velocity joint chamber 40. An inner race 42 is located and arranged within the outer race 36. The inner race 42 is connected to a stub shaft, drive shaft or prop shaft 26 of the vehicle. A plurality of balls or rolling elements 44 are located between an outer surface of the inner race 42 and the inner surface of the outer race 36. The balls 44 are held in position between the outer race 36 and the inner race 42 surfaces by a cage 46. Each race ball 44 is located within an indentation or track of the outer race inner surface. The rotation of the outer race 36 will rotate the inner race 42 at the same or constant speed thus allowing for constant velocity to flow through the joint 10 between the prop shaft 26 and the power take off unit or differential, that is at an angle up to a predetermined angle. The constant velocity joint 10 will allow the angle to change because the balls 44 will rotate and compensate for any differences in the angle between the shafts by moving within the outer race and inner race tracks. A ring retainer 48 or any other known fastener is arranged between the shaft 26 and the inner race 42 to connect the prop shaft or stub shaft 26 to the inner race 42. Any other type of connection is also possible between the prop shaft and the inner race.

A boot cover 50 is connected to an end of the outer race 36. One end of the boot cover 50 has a boot member 52, which in the preferred embodiment is made of a urethane, however it should be noted that any other type of hard or soft plastic, rubber, composite, fabric, or like material may also be used, secured to the boot cover 50 by any known fastening means. The other end of the boot 52 engages the shaft 26 and is held in place by a fastener such as a clamp or the like. The boot 52 will seal the constant velocity joint 10 from any outside contaminates, such as water, dirt and road grime. The suppleness of the boot 52 allows for a seal to be maintained to any angle of inclination that the drive shafts or half shafts may encounter during normal road way and off road driving operations.

The constant velocity joint 10 and associated assembly also includes a flange 38 that is in contact on one end of the outer race 36. The flange 38 is then connected to a transmission, a rear differential, or another portion of a prop shaft or half shaft 26 on an opposite end thereof. The flange 38 has a plurality of orifices 54 circumferentially arranged in a predetermined pattern around the outer circumference thereof. These orifices 54 align with a plurality of orifices 56 circumferentially arranged around an outer circumference of the constant velocity joint outer race 36. This flange 38 also includes a shoulder portion 58 which helps align and arrange the companion flange 38 with respect to the outer surface of the outer race 36.

Figure 3:
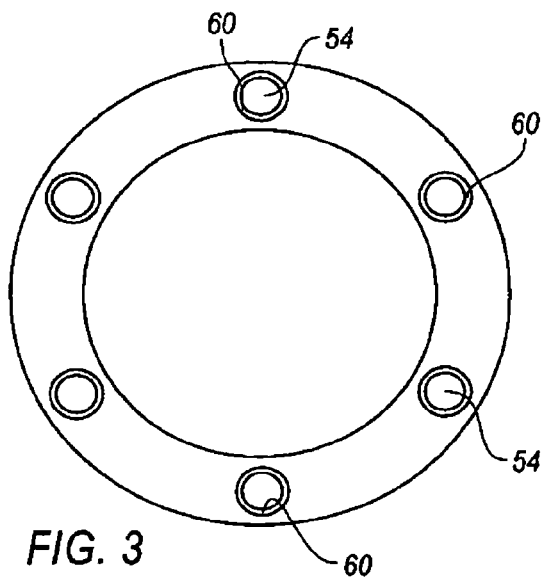
FIG. 3 and FIG. 4 show end view embodiments of constant velocity joints according to the present invention.

As shown in FIGS. 2 and 3, the flange 38 includes a plurality of pockets 60 formed either by machining, casting or the like within the orifices 54 of the flange 38. The pockets 60 will have a larger diameter than the diameter of the orifice 54 through the flange 38 surface. The pockets 60 will allow a cylindrical or sleeve like hollow or solid member 62 to be arranged within the pocket 60 of the flange 38. The outer race 36 of the constant velocity joint 10 also includes a plurality of pockets 64 arranged within the orifices 56 of the constant velocity joint 10. Both the companion flange pockets 60 and the pockets 64 of the constant velocity joint 10 will have a similar diameter. The diameter of the pocket 64 in the constant velocity joint outer race 36 will be larger than that of the orifices 56 through the outer race 36. The depth of the pockets 60, 64 within the outer race 36 and flange 38 will be predetermined depending on design requirements and the amount of torque to be transmitted therebetween.

Arranged within the pockets 60, 64 of the flange 38 and outer race 36 are a plurality of cylindrical, or sleeve like members 62. These members 62 may be either hollow, thus allowing for passing of a fastener 66 therein, or solid. The sleeves 62 will be arranged in each of the pockets 60, 64 around the circumferential edge of the outer race 36 and the flange 38. One end of the sleeve 62 will be arranged within the outer race pocket 64 while the other end of the sleeve 62 will be arranged within the pockets 64 of the flange 38. Each of the sleeves 62 will be in contact with the back of the pocket 60, 64 with one end thereof. The use of the sleeves or cylinders 62 will allow for torque transmission to be separated from the attachment function of the fasteners 66 used to connect the constant velocity joint 10 to the flange 38. As shown in FIG. 2 a fastener 66 is placed from the constant velocity joint side such that the head of the fastener 66 engages with a surface of the constant velocity joint outer race 36 or in the embodiment shown, with the boot cover 50. The fastener 66 is placed through the orifice 56 of the constant velocity joint into the sleeve 62 until the fastener 66 engages the threads or other surface of the orifice 54 of the flange 38 and is torqued down to predetermined torque specifications. This will secure the flange 38 to the outer race 36 using the bolt 66. All of the torque being transmitted through the constant velocity joint 10 will no longer apply any shearing force to the bolts 66 other than minimal and neglible shearing forces. As shown in FIGS. 2 and 3 the constant velocity joint assembly 10 is a six bolt assembly. Therefore, there are six orifices 54, 56 used to secure the constant velocity joint 10 to the flange 38 and as shown in the Figures there are six pockets 60, 64 formed in conjunction with each orifice on both the flange 38 and constant velocity joint outer race surface 36. These pockets 60, 64 then have a sleeve 62 arranged therein and then the flange 38 is aligned with the constant velocity joint outer race 36 and the sleeves 62 are inserted into the associated pockets 60, 64 in the flange orifices. Then the fasteners 66 are placed through the outer race 36 of the constant velocity joint 10 and torqued down to proper torque specifications with the companion flange 38.

Figure 5A:
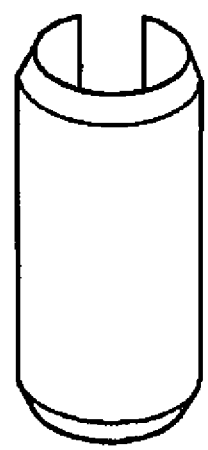
FIGS. 5A and 5B show alternative embodiments of hollow fasteners for use as according to the present invention.
Figure 5B:
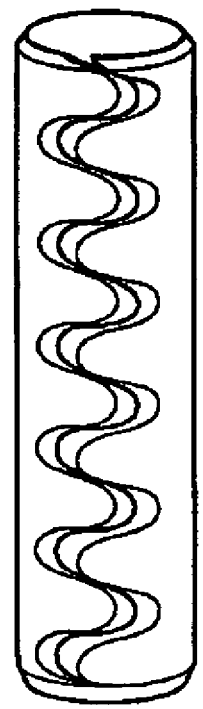

It should be noted that the above embodiment has been illustrated with a six bolt arrangement as shown in FIGS. 2 and 3. However, it should be noted that it is contemplated that the idea may be used on any design from two to sixteen fastener configurations. In the embodiment shown the sleeve like member 62 is a hollow dowel for use as a torque transmitting component. However, it should be noted that it is contemplated to use a spring pin, roll pin, peg, or any other known hollow fastener or component for use with the present invention. See FIGS. 5A and 5B.) In the embodiment shown the fasteners 66 are a bolt 66 which are commonly used to connect a constant velocity joint to a flange within a drive train environment. However, it should be noted that any type of fastener or correction method may also be used. With the bolts 66 being arranged through the hollow dowels 62 this will allow for the bolts 66 to attach the constant velocity joint 10 to the flange 38 and not be required to transmit torque through the assembly during rotation of the constant velocity joint 10 in its drive train application. The hollow dowels 62 will allow for torque transmission as required by the constant velocity joints specific applications thus separating the torque transmission from the attachment function of the constant velocity joint and flange assembly. It should be noted that all of the parts described above are made of steel however any other hard ceramic, metal, plastic, fabric, or the like may also be used. It should also be noted that any combination of hollow dowels 62 and attaching bolts 66 may be used for example only three of the orifices may have dowels 62 while all six of the orifices include an attaching bolt 66 therein. Therefore any combination of hollow dowels 62 to be used for transmitting the torque can be used with any combination of attaching bolts 66.

Figure 4:
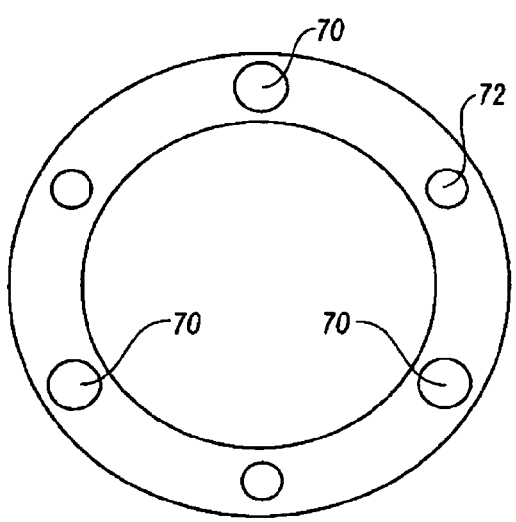

FIG. 4 shows an alternate embodiment of the torque transfer and attachment apparatus according to the present invention. FIG. 4 shows the alternate construction where a plurality of solid dowels 70 or cylinder like shaped components arranged in any number of patterns with attaching bolts 72. In the embodiment shown the bolts 72 are circumferentially arranged in an alternating pattern with the solid dowels 70. This alternating pattern will allow for balancing within the constant velocity joint assembly thus eliminating any vibrations within the prop shaft. With the solid dowel 70 arranged alternately with an attaching bolt 72 this will allow the solid dowels 70 to transmit the torque through the joint while the alternating bolts 72 will attach the constant velocity joint to the companion flange. It should be noted that any combination can be used depending on the torque transmission requirements and attachment requirements with the drive train system. Hence for example, four solid dowels 70 may be used with two bolts 72, or two solid dowels 70 may be used with four bolts 72, depending on the design requirements of the drive train assembly. This alternate embodiment also will separate the torque transmitting from the attachment components of the constant velocity joint assembly. The solid dowels 70 will be arranged within the constant velocity joint pockets and the flange pockets. In all embodiments contemplated, it should be noted that during initial assembly the dowels can be positioned in either of the pockets of the flange or the pockets of the constant velocity joint or in both depending on the installation requirements and space available on the underbody packaging.

In operation the flange 38 and outer race 36 are aligned such that the sleeve member 62 which is prearranged in either a pocket 60, 64 of the flange 38 or the outer race 36 will align with and be arranged within the opposite opposing pocket. Once the sleeve like members 62 are fully inserted in the pockets 60, 64 of both the outer race 36 and the flange 38, a plurality of fasteners 66 will be placed through the orifices of the constant velocity joint and through the sleeves 62 into the orifice of the companion flange 38 and then torqued down to a predetermined torque value. Hence, the sleeves 62 will separate the attachment component from the torque transmitting component of the constant velocity joint 10. Thus, during operation the bolts 66 will only ensure the secure attachment between the flange 38 and the constant velocity joint 10 while the sleeve like members 62 will transmit torque from the constant velocity joint 10 to the flange 38. Therefore, the constant velocity joint 10 will be axially retained within the prop shaft environment via the bolts 66 while any torque will be transmitted through the constant velocity joint 10 and the prop shaft by the dowels or sleeve like members 62.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A constant velocity joint, said joint comprising:
   an outer race;
   an inner race arranged within said outer race;
   a flange proximate to one end of said outer race;
   a plurality of sleeves, each of said plurality of sleeves having a first end arranged within said outer race and a second end arranged within said flange; and
   a plurality of fasteners securing said outer race to said flange.

2. The joint of claim 1 wherein said sleeves are a hollow dowel.

3. The joint of claim 1 wherein said sleeves are a spring pin.

4. The joint of claim 1 wherein said sleeves are a roll pin.

5. The joint of claim 1 wherein said outer race having a plurality of pockets in a surface.

6. The joint of claim 5 wherein said flange having a plurality of pockets in a surface.

7. The joint of claim 6 wherein one of said sleeves is arranged within a pocket of said outer race and a pocket of said flange.

8. The joint of claim 7 wherein said sleeves carry a torque transmission of the joint.

9. The joint of claim 8 wherein said fasteners are a bolt.

10. The joint of claim 9 wherein said bolts attach said outer race to said flange without transmitting torque.

11. The joint of claim 1 wherein said sleeves are arranged in predetermined patterns at predetermined positions depending on torque transmission requirements.

12. The joint of claim 10 wherein said bolts are arranged within said sleeves.

13. A torque transmission assembly for use in a vehicle, said assembly comprising:
   a constant velocity joint;
   a flange proximate to said constant velocity joint;
   a plurality of sleeves each of said plurality of sleeves having a first end arranged within said constant velocity joint and a second end arranged within said flange to transmit torque through the assembly; and
   a plurality of fasteners securing said constant velocity joint to said flange.

14. The assembly of claim 13 wherein said constant velocity joint having a plurality of pockets formed in a surface thereof.

15. The assembly of claim 14 wherein said flange having a plurality of pockets formed in a surface thereof.

16. The assembly of claim 15 wherein said sleeves are arranged within said pockets of said constant velocity joint on one end and within said pockets of said flange on an opposite end.

17. The assembly of claim 16 wherein said fasteners are arranged within said sleeves.

18. The assembly of claim 13 wherein said sleeves are a hollow dowel, a spring pin or a roll pin.

19. The assembly of claim 13 wherein said fasteners are a bolt.

20. The assembly of claim 13 wherein said sleeves are solid and arranged in a predetermined pattern with said fasteners.

* * * * *